United States Patent
Leppänen et al.

(10) Patent No.: US 9,706,399 B2
(45) Date of Patent: Jul. 11, 2017

(54) METHODS AND APPARATUS FOR ANONYMOUS KEY MANAGEMENT IN MOBILE AD HOC NETWORKS

(71) Applicant: Nokia Technologies Oy, Espoo (FI)

(72) Inventors: Kari J. Leppänen, Helsinki (FI); Markku T. Turunen, Helsinki (FI); Philip Ginzboorg, Espoo (FI); Pentti Valtteri Niemi, Rymättylä (FI); Hamza Harkous, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 14/063,177

(22) Filed: Oct. 25, 2013

(65) Prior Publication Data
US 2014/0122882 A1    May 1, 2014

Related U.S. Application Data

(60) Provisional application No. 61/718,984, filed on Oct. 26, 2012.

(51) Int. Cl.
*H04W 12/06* (2009.01)
*H04L 29/06* (2006.01)
(Continued)

(52) U.S. Cl.
CPC ......... *H04W 12/06* (2013.01); *H04L 9/0872* (2013.01); *H04L 9/0891* (2013.01);
(Continued)

(58) Field of Classification Search
None
See application file for complete search history.

(56) References Cited

U.S. PATENT DOCUMENTS

| 7,234,058 B1 | 6/2007 | Baugher et al. ............... 713/163 |
| 7,567,673 B2 * | 7/2009 | Fukuzawa ............... H04M 3/38 380/270 |

(Continued)

FOREIGN PATENT DOCUMENTS

WO   WO-2010/128382 A1   11/2010

OTHER PUBLICATIONS

Kate et al., "Anonymity and Security in Delay Tolerant Networks", Sep. 17, 2007, IEEE, pp. 504-513.*

(Continued)

*Primary Examiner* — Farid Homayounmehr
*Assistant Examiner* — Henry Tsang
(74) *Attorney, Agent, or Firm* — Harrington & Smith

(57) ABSTRACT

Systems and techniques for key management in mobile ad hoc networks are described. Pseudonyms are defined for group members of mobile ad hoc networks such that a pseudonym in a message can be deterministically identified with the sending device only by the sending device and the message recipient. Key management for a group is performed by a group manager, and key management may include key renewal and revocation. Key renewal is performed by a group manager, with the group manager using a set of couple pseudonyms, including a couple pseudonym between the manger and each group member. Key renewal employs a renewal key used to encrypt the updated group key, and the group manager updates the group key be transmitting a message to each group member in proximity, with the message being identified using the couple pseudonym of the manager and the group member.

18 Claims, 7 Drawing Sheets

(51) Int. Cl.
  *H04W 12/04* (2009.01)
  *H04L 9/08* (2006.01)
  *H04L 9/32* (2006.01)
(52) U.S. Cl.
  CPC .......... *H04L 9/3242* (2013.01); *H04L 63/065* (2013.01); *H04W 12/04* (2013.01); *H04L 2209/42* (2013.01); *H04L 2209/80* (2013.01)

(56) References Cited

U.S. PATENT DOCUMENTS

| | | | | |
|---|---|---|---|---|
| 2009/0327737 | A1* | 12/2009 | Hsu | G06F 21/121 713/181 |
| 2010/0285774 | A1* | 11/2010 | Ginzboorg | H04L 63/104 455/411 |
| 2012/0114124 | A1* | 5/2012 | Du | H04L 9/083 380/278 |

OTHER PUBLICATIONS

Zhang et al., "A Cluster-Based Group Key Management Scheme for Wireless Sensor Networks", Apr. 6, 2010, IEEE, pp. 386-388.*

Perrig, A. et al.; "SPINS: Security Protocols for Sensor Networks"; Mobile Computing and Networking; 2001; whole document (11 pages); Rome, Italy.

Kulkarni, S. et al.; "Adaptive Rekeying for Secure Multicast"; IEICE Trans. Commun., vol. E85-A, No. 10; Oct. 2003; whole document (9 pages).

Wong, C.K. et al.; "Secure Group Communications Using Key Graphs"; IEEE/ACM Transactions on Networking, vol. 8, No. 1; Feb. 2000; pp. 16-30.

Li, Q. et al.; "Multicast Authentication in the Smart Grid With One-Time Signature"; IEEE Transactions on Smart Grid, vol. 2, No. 4; Dec. 2011; pp. 686-696.

Wu, B. et at.; "An efficient group key management scheme for mobile ad hoc networks"; International Journal of Security and Networks, 4(1/2); 2009; pp. 125-134.

Waldvogel, M. et al.; "The VersaKey Framework: Versatile Group Key Management"; IEEE Journal on Selected Areas in Communications, vol. 17, No. 9; Sep. 1999; pp. 1614-1631.

Gruteser, M. et al.; "Enhancing Location Privacy in Wireless LAN Through Disposable Interface Identifiers: A Quantitative Analysis"; WMASH'03; Sep. 19, 20031 San Diego, CA, USA; whole document (10 pages).

Beresford, A.; "Location privacy in ubiquitous computing"; Technical Report UCAM-CL-TR-612; University of Cambridge Computer Laboratory; Jan. 2005; whole document (139 pages).

Kate et al. 'Anonymity and Security in Delay Tolerant Networks', Third International Conference on Security and Privacy in Communications Networks and the Workshops, 2007, IEEE, Sep. 17, 2007, pp. 504-513, chapter V, parts C, E and chapter VI, part B.

Jia-Lun Tsai et al. *Secure Anonymous Authentication Protocol with Unlinkability for Mobile Wireless Enviroment* Anti-Counterfeiting, Security and Identification (ASID), 2012 International Conference on, IEEE, Aug. 24, 2012, pp. 1-5, XP032247588.

* cited by examiner

METHODS AND APPARATUS FOR ANONYMOUS KEY MANAGEMENT IN MOBILE AD HOC NETWORKS

CROSS-REFERENCE TO RELATED APPLICATIONS

This application claims the benefit of U.S. Provisional Application No. 61/718,984, filed Oct. 26, 2012, and incorporated herein by reference in its entirety.

FIELD OF THE INVENTION

The present invention relates generally to data communication and security. More particularly, the invention relates to key management in mobile ad hoc group networks.

DEFINITIONS

The following are some of the abbreviations and symbols, with definitions, that may be used in the present specification:
AcM Acknowledgement message
$D_k$ Decryption function for $E_k$ with key k
$E_k$ Authenticated encryption function (AES-EAX) with key k
F HMAC-SHA-256 hash function
$F_{RKi,j}$ A hash function for derivation of couple encryption keys ($K_{Q,i,j}$) and couple pseudonyms (e.g. $q_{i,j,1}$) for a pair ($U_i$, $U_j$)
$F_{UKi}$ A hash function for derivation of authentication keys ($K_{A,i}$) and user pseudonyms ($z_i$) for $U_i$
$K_{A,i}$ Authentication key for $U_i$
$K_{g1}$ Group encryption key for group 1
$K_{Q,i,j}$ Couple encryption key for a pair ($U_i$, $U_j$)
lookup A function that searches the stored tables
MAC Message Authentication Code
max Number of possible device pseudonyms
$PPM_i$ Privacy preserving mechanism for $U_i$
$Q_{i,j}$ Couple identifier for a pair ($U_i$, $U_j$)
$Q_{j,i}$ Couple identifier for a pair ($U_j$, $U_i$)
$q_{i,j,1}$ First couple pseudonym of ($U_i$, $U_j$)
$q_{i,j,2}$ Second couple pseudonym of ($U_i$, $U_j$)
$RK_{i,j}$ Renewal key for ($U_i$, $U_j$)
$RK_{j,i}$ Renewal key for ($U_j$, $U_i$)
RnM Key renewal message
salt Public fixed string (known system-wide)
SeAcM Acknowledgement for a user search message
SeM User search message
t Current time period
$U_i$ Static user identifier for a user i
$UK_i$ User key for $_{Ui}$
Verify MAC verification function
$x_g$ Group pseudonym of a group g
$z_i$ User pseudonym of $U_i$
< String comparison function

BACKGROUND

The increasing proliferation of mobile communication devices is accompanied by an increasing desire by users for flexibility in their communications. One widely used approach is the formation of groups of mobile devices; formation of such groups allows communication between mobile devices without a need for participation by a base station in organization or management of the group. Data between group members is typically secured using a shared symmetric key, known by all current group members. Group management may be accomplished by one of the group members, suitably referred to as a group manager. The group manager distributes the key to new members joining the group and renews the key when a device leaves or is revoked from the group. Each mobile device can belong to multiple groups and the group manger may manage multiple groups.

Group communication may be performed, for example, through a wireless multi-hop broadcast medium. The organization of the group typically allows for communication between group members without previous planning, so that meeting times between group members and availability of group members are difficult to predict. When a key needs to be renewed, only a subset of a group's members might be available, with others being out of range or turned off.

SUMMARY OF THE INVENTION

In one embodiment of the invention, an apparatus comprises at least one processor and memory storing a program of instructions. The memory storing the program of instructions is configured to, with the at least one processor, cause the apparatus to at least define a set of user pseudonyms for a wireless device, define an authentication key derived from a user key based at least in part on the user pseudonym, and engage in communication by transmitting at least one message, wherein each message associated with the device employs an authentication key derived from a user key based at least in part on a user pseudonym.

In another embodiment of the invention, an apparatus comprises at least one processor and memory storing a program of instructions. The memory storing the program of instructions is configured to, with the at least one processor, cause the apparatus to at least define a couple pseudonym unique to an associated couple of devices, wherein the couple of devices are wireless devices belonging to a group communicating messages encrypted by a shared key and include in messages to be transmitted to one of the couple of devices key update information identified based at least in part on the couple pseudonym.

In another embodiment of the invention, an apparatus comprises at least one processor and memory storing a program of instructions. The memory storing the program of instructions is configured to, with the at least one processor, cause the apparatus to at least store data identifying its most recent detection of an authenticated message from a user in a group of wireless devices of which a specified wireless device is the manager, wherein the wireless devices in the group communicate with a shared key, with each of the wireless devices having at least one associated user pseudonym for use in identifying and authenticating messages, of which a specified wireless device is the manager, and determine if the user is in proximity by comparing an elapsed duration since a message from the user was detected with an expiration period.

In another embodiment of the invention, an apparatus comprises at least one processor and memory storing a program of instructions. The memory storing the program of instructions is configured to, with the at least one processor, cause the apparatus to at least send a user search message containing pseudonyms for all wireless devices in a group of wireless devices of which a specified wireless device is the manager, wherein the wireless devices in the group communicate with a shared key, with each of the wireless devices having at least one associated user pseudonym for use in identifying and authenticating messages, wherein the pseudonyms are pseudonyms of devices that have failed to acknowledge a most recent key renewal message by the group manager and that have not been detected for a predetermined period and, upon receiving a search acknowledgement message, update a database with a new key and to initiate a key renewal.

In another embodiment of the invention, a method comprises defining an authentication key derived from a user key based at least in part on the user pseudonym and engaging in communication by transmitting at least one message, wherein each message associated with the device employs an authentication key derived from a user key based at least in part on a user pseudonym.

In another embodiment of the invention, a method comprises defining a couple pseudonym unique to an associated couple of devices and including in messages to be transmitted to one of the couple of devices key update information identified based at least in part on the couple pseudonym.

In another embodiment of the invention, a method comprises storing data identifying its most recent detection of an authenticated message from a wireless device in a group of wireless devices of which a specified wireless device is the manager, wherein the wireless devices in the group communicate with a shared key, with each of the wireless devices having at least one associated user pseudonym for use in identifying and authenticating messages, of which a specified wireless device is the manager, and determining if the wireless device is in proximity by comparing an elapsed duration since a message from the user was detected with an expiration period.

In another embodiment of the invention, a method comprises sending a user search message containing pseudonyms for all wireless devices in a group of wireless devices of which a specified wireless device is the manager, wherein the wireless devices in the group communicate with a shared key, with each of the wireless devices having at least one associated user pseudonym for use in identifying and authenticating messages, wherein the pseudonyms are pseudonyms of devices that have failed to acknowledge a most recent key renewal message by the group manager and that have not been detected for a predetermined period and, upon receiving a search acknowledgement message, update a database with a new key and to initiate a key renewal.

In another embodiment of the invention, a computer readable medium stores a program of instructions, execution of which by a processor configures an apparatus to at least define a set of user pseudonyms for a wireless device, define an authentication key derived from a user key based at least in part on the user pseudonym, and engage in communication by transmitting at least one message, wherein each message associated with the device employs an authentication key derived from a user key based at least in part on a user pseudonym.

In another embodiment of the invention, a computer readable medium stores a program of instructions, execution of which by a processor configures an apparatus to at least define a couple pseudonym unique to an associated couple of devices, wherein the couple of devices are wireless devices belonging to a group communicating messages encrypted by a shared key, and include in messages to be transmitted to one of the couple of devices key update information identified based at least in part on the couple pseudonym.

In another embodiment of the invention, a computer readable medium stores a program of instructions, execution of which by a processor configures an apparatus to at least store data identifying its most recent detection of an authenticated message from a wireless device in a group of wireless devices of which a specified wireless device is the manager, wherein the wireless devices in the group communicate with a shared key, with each of the wireless devices having at least one associated user pseudonym for use in identifying and authenticating messages, of which a specified wireless device is the manager, and determine if the wireless device is in proximity by comparing an elapsed duration since a message from the user was detected with an expiration period.

In another embodiment of the invention, a computer readable medium stores a program of instructions, execution of which by a processor configures an apparatus to at least send a user search message containing pseudonyms for all wireless devices in a group of wireless devices of which a specified wireless device is the manager, wherein the wireless devices in the group communicate with a shared key, with each of the wireless devices having at least one associated user pseudonym for use in identifying and authenticating messages, wherein the pseudonyms are pseudonyms of devices that have failed to acknowledge a most recent key renewal message by the group manager and that have not been detected for a predetermined period and, upon receiving a search acknowledgement message, update a database with a new key and to initiate a key renewal.

In another embodiment of the invention, an apparatus comprises means for defining an authentication key derived from a user key based at least in part on the user pseudonym, and means for engaging in communication by transmitting at least one message, wherein each message associated with the device employs an authentication key derived from a user key based at least in part on a user pseudonym.

In another embodiment of the invention, an apparatus comprises means for defining a couple pseudonym unique to an associated couple of devices, and means for including in messages to be transmitted to one of the couple of devices key update information identified based at least in part on the couple pseudonym.

In another embodiment of the invention, an apparatus comprises means for storing data identifying its most recent detection of an authenticated message from a wireless device in a group of wireless devices of which a specified wireless device is the manager, wherein the wireless devices in the group communicate with a shared key, with each of the wireless devices having at least one associated user pseudonym for use in identifying and authenticating messages, of which a specified wireless device is the manager, and means for determining if the wireless device is in proximity by comparing an elapsed duration since a message from the user was detected with an expiration period.

In another embodiment of the invention, an apparatus comprises means for sending a user search message containing pseudonyms for all wireless devices in a group of wireless devices of which a specified wireless device is the manager, wherein the wireless devices in the group communicate with a shared key, with each of the wireless devices having at least one associated user pseudonym for use in identifying and authenticating messages, wherein the pseudonyms are pseudonyms of devices that have failed to acknowledge a most recent key renewal message by the group manager and that have not been detected for a predetermined period and means for, upon receiving a search acknowledgement message, update a database with a new key and to initiate a key renewal.

DETAILED DESCRIPTION

Figure 1:
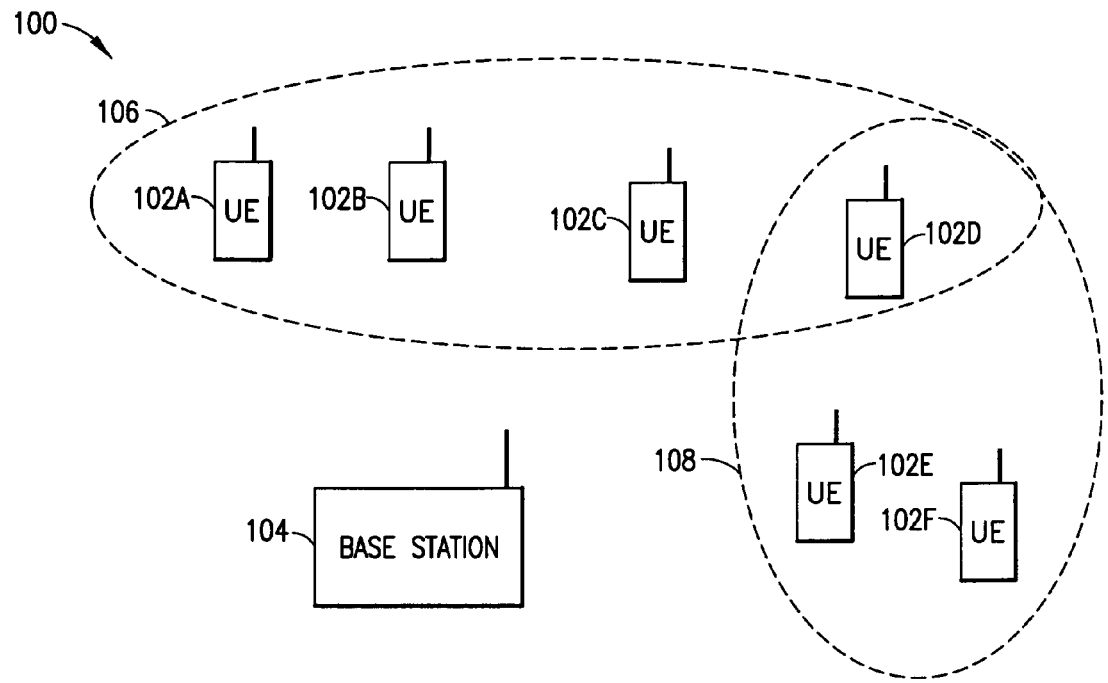
FIG. 1 illustrates a system according to an embodiment of the present invention.

Embodiments of the present invention recognize that a number of features increase the usefulness and security and decrease the resource consumption of group networks. For example, it is desirable that devices operate with as little computational, storage, and communication overhead as possible. In addition, immediate forward secrecy is desired—if a node is revoked, the revoked node should not be able to securely send or receive group messages after revocation. That is, the revoked node should not be able to send messages secured with the group's security information, and should not be able to read messages secured with the group's security information.

In addition, short renewal latency is desired, with a minimum time between a change of the group key by the group manager and distribution of the group key to available members.

Embodiments of the invention further recognize that a group manager needs to guarantee the anonymity of targeted nodes in key renewal. Thus, if the group manager needs to update the device $U_i$ with the new key, no party other than the group manager and the device $U_i$ should be able to deterministically decide that a key renewal message originated at the group manager and included an update for $U_i$. Each user $U_i$ may identify itself through a set of pseudonyms $ID_i$.

Such an approach may achieve the prevention of knowledge by revoked nodes that they have been expelled from the group, and also may achieve the prevention of knowledge by external eavesdroppers that any two nodes belong to the same group. In addition, this approach prevents group members from gaining knowledge of the identities of other group members from updating of key information.

Key update messages are identified by the -tuple (source, destination, group). If anonymity is not required, these fields can be all included explicitly in cleartext in the message so that the targeted device detects the relevant messages. In anonymous networks, competing goals give rise to a conflict between (1) explicitly including these fields, resulting in exposing the communicating parties to eavesdroppers and (2) including fields encrypted in the message, thus requiring each node to perform a decryption operation for any such message to know whether it is the target. Moreover, in such mobile networks, devices may not always be accessible to the group manager, and no specific meeting times are set for the group members. In addition, the devices can change lower layer identifiers for privacy reasons. Hence it is difficult to schedule key updates between the devices.

The manager GM in each group in a mobile ad hoc network is responsible for the keys of the group members. Each member has a user identifier $U_i$, a user pseudonym $z_i$, and an individual user key $UK_i$. $z_i$ is derived from $U_i$ and $UK_i$, which are in turn shared between the manager on one hand and each member on the other hand (and vice-versa: each member shares his keys with the GM).

In one or more embodiments of the invention, a group manager shares with each member an identifier called the couple identifier $Q_{i,j}$ and a symmetric key called renewal key $RK_{i,j}$. A new group key $K'_g$ is updated by broadcasting its encryption under a key derived from $RK_{i,j}$. The renewal messages are identified via including couple pseudonyms $Q_{i,j,1}$ derived from the couple identifier and the renewal key. These key renewal updates are reactively broadcast upon detecting a user in proximity. An acknowledgement (ack) is broadcast by the targeted user in the opposite direction.

Device $U_i$ assumes $U_j$ to be in proximity if:
(1) $U_j$ has sent a data message that has been verified by $U_j$ in some group within time $T_{expiry}$ or
(2) $U_j$ has sent a special user search message including a couple pseudonym of the identifier $Q_{j,i}$.

$U_j$ sends user search messages to $U_i$ if the latter is characterized by the following condition: "there is no ack from user $U_i$ corresponding to the last key renewal message by $U_j$ and some period $T_{max}$ has passed since $U_i$ was last seen."

FIG. 1 illustrates a system 100 comprising a plurality of wireless devices 102A, 102B, . . . , 102N, suitably equipped for peer to peer communication when within radio range of one another. The devices 102A-102E may also be equipped to communicate through a base station 104. The devices 102A-102D may belong to a first group 106, and the devices 102D-102F may belong to a second group 108, with the device 102D being designated as the group manager for both of the groups 106 and 108.

In general terms, each device in a system such as the system 100 may correspond to a single user with a static identifier $U_i$. A system may comprise n users forming the set $U_1, U_2, \ldots, U_n$.

Each of the devices 102A-102E may employ a link layer identifier, such as a media access control (MAC) address, a network layer identifier, such as an internet protocol (IP) address, and application layer identifiers. The identifiers can all be changed at desired points as part of a privacy preserving mechanism (PPM).

Each user $U_i$ belongs to a fixed number of groups $n_g$. The entire set of groups is defined as $\{G_1, G_2, \ldots, G_m, \ldots, G_{max}\}$, where max is the total number of groups in the system, and $G_m$ is the static identifier of the $m^{th}$ group. A group $G_m$ further comprises a set of users $G_m=\{U_i\}$ that share a secret group key $K_g$.

In an example, an embodiment of the present invention may be considered with respect to a discrete time system, initialized at time t=0, and in the present discussion users may be considered at a discrete time instant t or, at appropriate points, a time period from t to t+1. From a real system point of view, $_t$ can be incremented after a certain clock time period set by the PPM elapses. Such a time period may, for example, be 1 hour, 1 day, or another desired time period. Embodiments of the invention also address the addition of operations performed by the PPM upon each new time period.

In one or more embodiments the present invention addresses user anonymity, key renewal that preserves anonymity while avoiding excessive complexity in computation and signaling, and proximity detection in the face of changing of user identifiers.

User Anonymity

In one or more embodiments, a user may be denoted by a set of identifiers that may suitably be referred to as user pseudonyms, and that may be allowed to change over time. Suppose that $ID_i(t)$ is the set of user pseudonyms of $U_i$ at time t and $ID_i(t)=\{z_{i,l}\}$, where $z_{i,l}$ is the index of the $l^{th}$ user pseudonym. Also, a user $U_i$ initially possesses a secret user key $UK_i$. Each group manager shares its $U_i$ and $UK_i$ with all the group members. In turn, each group member shares its corresponding user identifier and key with the manager via an external pairwise secure channel.

The data messages securely exchanged in each group are of the format: U_k→G_m: z_(i,j)|p_(m,l)|msg, where p_(m, l) is some group pseudonym, and msg is a message encrypted and authenticated using the group key, and may also use other keys for encryption, authentication, or both.

Identifiers from other layers exist that deterministically link two user pseudonyms to the same user. Theoretically, with each sent authenticated message, there should be a user pseudonym drawn from the set $ID_i(t)$ of user pseudonyms in period t.

However, no advantage with respect to unlinkability of a user pseudonym with a user identifier is achieved if different user pseudonyms are drawn from $ID_i(t)$ while the other identifiers are kept constant. Those identifiers, in turn, are only changed upon a new time period according to the PPM. Therefore, no genuine advantage is sacrificed if user pseudonyms are changed only upon incrementing t. One or more embodiments of the invention therefore employ the following approach to managing user pseudonyms for user $U_i$ at each new time period t:

Set $ID_i(t)=\{z_i\}$, where $z_i=F_{UK}(U_i, t, salt_2)$, F is a hash function such as HMAC-SHA-256 and $salt_2$ is a string set by the system and used by all devices.

An authentication key $K_A$, used for message authentication, is derived from the user key UK as $KA,i=F_{UKi}(U_i, t, sak_1)$, where $salt_1$ is a string set by the system and used by all devices. The authentication key is also changed with each new time period as a part of the PPM while UK is only changed when one the user decides to prevent a previously authorized node from verifying its message. Only $U_i$ stays constant. In that regard, each user's set of verifiers can be thought of as a group in the system, similar to the general groups, but in which the group key is the user key and group manager is the user himself.

Key Renewal

One or more embodiments of the invention recognize that the presence of multiple groups in a system such as the system 100 requires a technique for identifying the source and the destination of key renewal messages. Embodiments of the invention further recognize that explicitly including user identifiers violates the anonymity of key updates but that removing these identifiers completely requires each device to perform a decryption operation for each such message. Performing a decryption operation in every case is wasteful because the operation consumes resources, and in most cases is not needed.

Embodiments of the present invention address overcome these and other difficulties by:

Using broadcast messages where the destination identifier is not included at any layer. The sender identifier is generally not omitted as it is likely to be deducible from other layers. The group identifier can be encrypted along with the new group key; and Appending a couple pseudonym unique to each couple of devices, rather than explicit identifiers or individual pseudonyms. One or more embodiments of the present invention therefore employ an identifier that represents not one node but a pair of nodes having a defined relationship.

In one or more embodiments, the invention employs an identifier that identifies a couple of nodes at a time: the manager $U_i$ and the member $U_j$. The identifier may be referred to as a couple identifier $Q_{i,j}$, allowing the group member $U_j$ to verify key renewal messages from the manager $U_i$.

In addition, an individual key, called the Renewal Key $R_{i,j}$ is exclusively shared between the group manager $U_i$ and the member $U_j$. Both the couple identifier and the renewal key are the same for this couple, in any number of groups, so long as $U_i$ plays the manager role and $U_j$ plays the member role. However, when the roles are reversed, the identifier and the key change. ($Q_{i,j} \neq Q_{j,i} \cap RK_{i,j} \neq RK_{j,i}$). $Q_{i,j}$ may be referred to as the reverse couple of $Q_{j,i}$.

Couple identifiers and the renewal keys may conveniently be non-revocable. They are the basic information that characterize the individual secure channel between a couple of nodes, and there is no need for changing them because each set of a couple identifier and a renewal key relate to a single communication. If the node $U_i$ is revoked, the couple identifier and the renewal key for that user can simply be abandoned; there is no need to replace the identifier and key.

However, for privacy reasons, the couple identifier should not be transmitted as it is through unprotected channels. Such an approach allows the adversary to recognize that all the messages between this couple, rendering useless other privacy preserving mechanisms where identifiers are changed.

Figure 2:
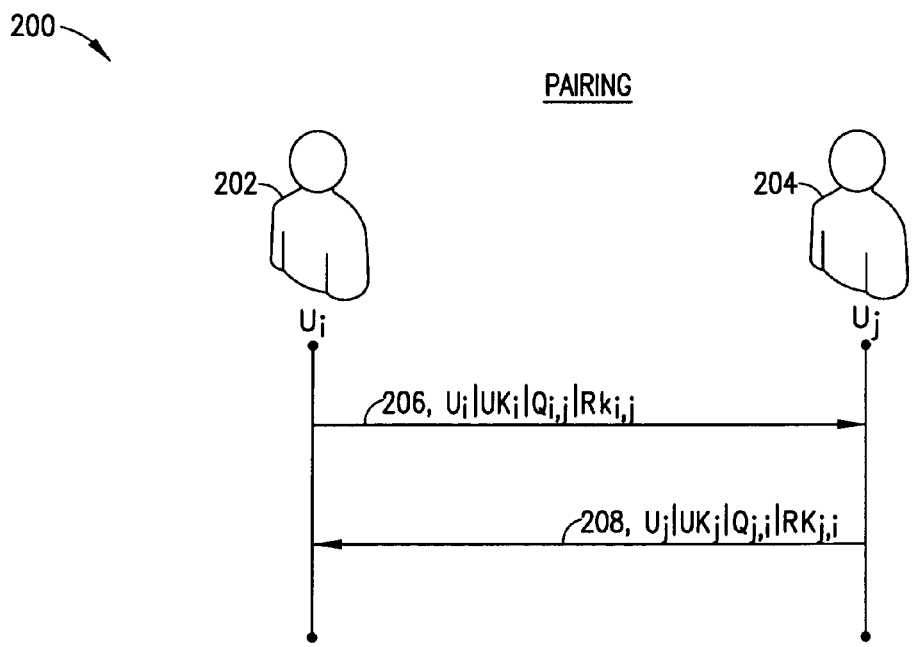
FIGS. 2-7 illustrate exemplary procedures according to embodiments of the present invention.

Thus, one or more embodiments of the invention employ couple pseudonyms $q_{i,j,l}$, whenever $U_i$ is the group manager and $U_j$ is a group member (where l corresponds to the $l^{th}$ couple pseudonym). During a key sharing step (via an external pairwise secure channel), along with the user identifiers and user keys, each couple of two nodes exchange the couple identifiers and keys, as illustrated in FIG. 2 and discussed in additional detail below.

Two users $U_i$ and $U_j$ are said to form a mutual couple if $U_i$ shares the user identifier, user key, $Q_{i,j}$, and $RK_{i,j}$ with $U_j$, and if $U_j$ shares the user identifier, user key, $Q_{j,i}$, and $RK_{j,i}$ with $U_i$. The couple renewal key $RK_{i,j}$ is not used directly for encrypting the renewal messages, so as to avoid exposure of information sufficient to allow an attacker to derive the key. A temporary key, called the couple encryption key $K_{Qi,j}$, may thus be defined as follows:

$K_{Qi,j}(t)=F_{R K_{i,j}}(Q_{i,j}, t, salt_2)$, where F is a hash function, for example, HMAC-SHA-256, and $salt_2$ is a fixed, public, system-wide string. Updating this key is part of the privacy preserving module (PPM).

Couple pseudonyms are designed so as to achieve couple anonymity:

For any couple ($U_i$, $U_j$), there is couple anonymity at time t if and only if for all pseudonyms ($q_{i,j,1}$ of $Q_{i,j}$, no node other than these two can deterministically verify that $q_{i,j,1}$ is a valid couple pseudonym of ($U_i$, $U_j$).

Pseudonyms are generated as follows:

$$q_{i,j,1}(t) = \begin{cases} F_{RK_{i,j}}(Q_{i,j}, t, salt_1) & \text{if } U_i \leq U_j \\ F_{RK_{i,j}}(Q_{i,j}, t, salt_2) & \text{if } U_j < U_i \end{cases}$$

$$q_{i,j,2}(t) = \begin{cases} F_{RK_{j,i}}(Q_{j,i}, t, salt_1) & \text{if } U_i \leq U_j \\ F_{RK_{j,i}}(Q_{j,i}, t, salt_2) & \text{if } U_j < U_i \end{cases}$$

Figure 4:
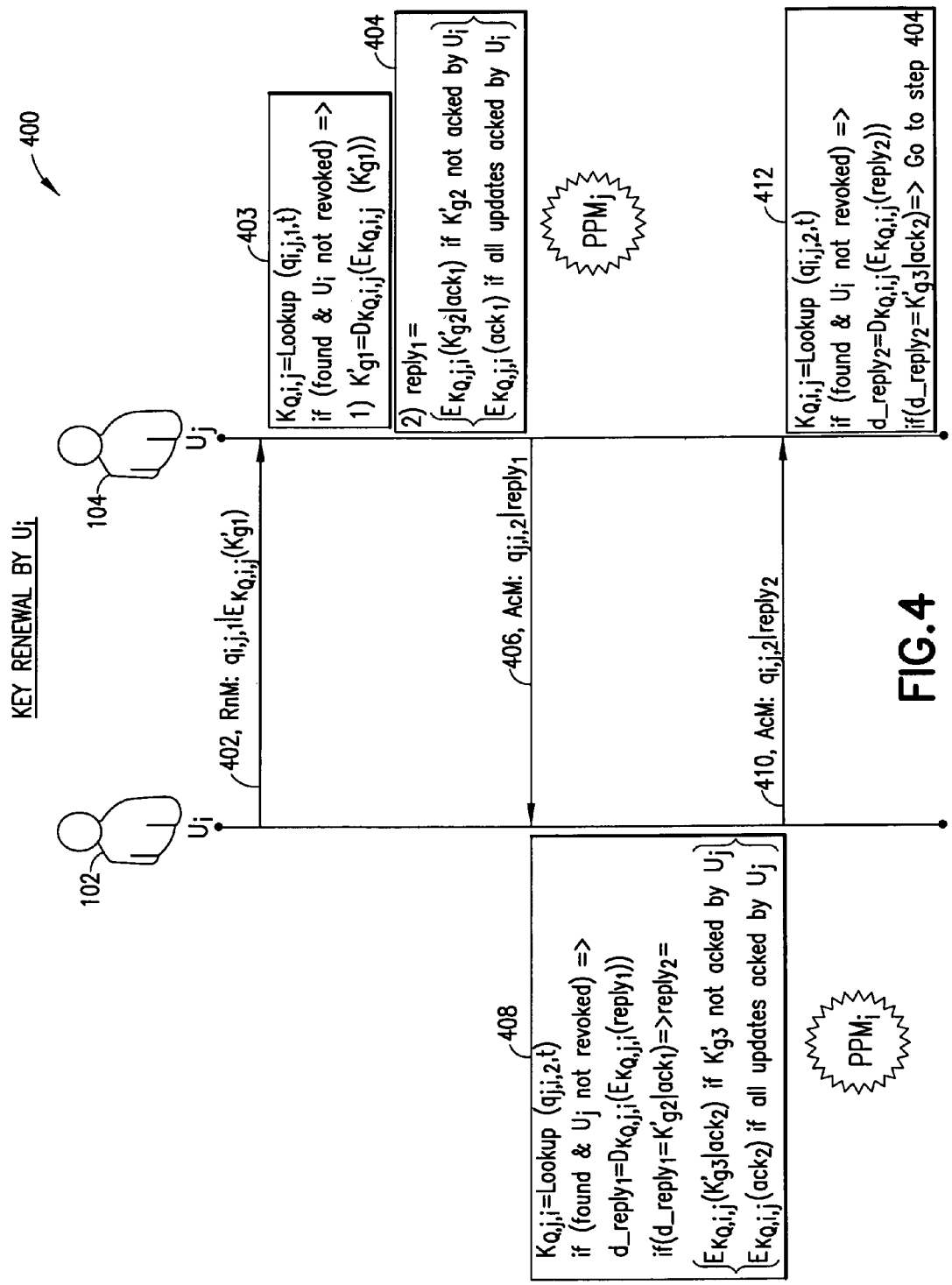

Embodiments of the invention employ mechanisms for key renewal, in which the generation of pseudonyms satisfies couple anonymity as defined above. The case in which $U_i$ renews its group key is illustrated in FIG. 4 and discussed further below.

1. $U_i$ proceeds by broadcasting the new group key $K'_{gi}$, encrypted via an authenticated encryption function E (e.g. AES-EAX) keyed with the couple encryption key $K_{q,i,j}$ to $U_j$.

2. If $U_j$ finds a match for the attached pseudonym $q_{i,j,1}$, it updates its database with the new key. If $U_j$ has not blocked $U_i$ from all its groups, it replies by broadcasting an acknowledgment message, encrypted with $K_{Q,j,i}$ and containing $q_{j,i,2}$ as a pseudonym. In case $U_j$ also has a new group key $K'_{g2}$ to transmit to $U_i$, the encrypted message contains that key to save a new key renewal operation.

3. In turn, when $U_i$ receives the message, it looks up the couple pseudonym and decrypts to discover that it is from $U_j$. $U_i$ records that $U_j$ now has the updated key. If the message also contains a key from $U_j$, $U_i$ must acknowledge the receipt of that key. Again, it can exploit that message to also include a new key $K'_{g2}$ not yet acknowledged by $U_j$.

4. When $U_j$ receives that message and discovers its source, it proceeds by decrypting it. In case it has an ack only, it records that in its databases; otherwise it proceeds in forming a reply as in step 2.

Figure 5:
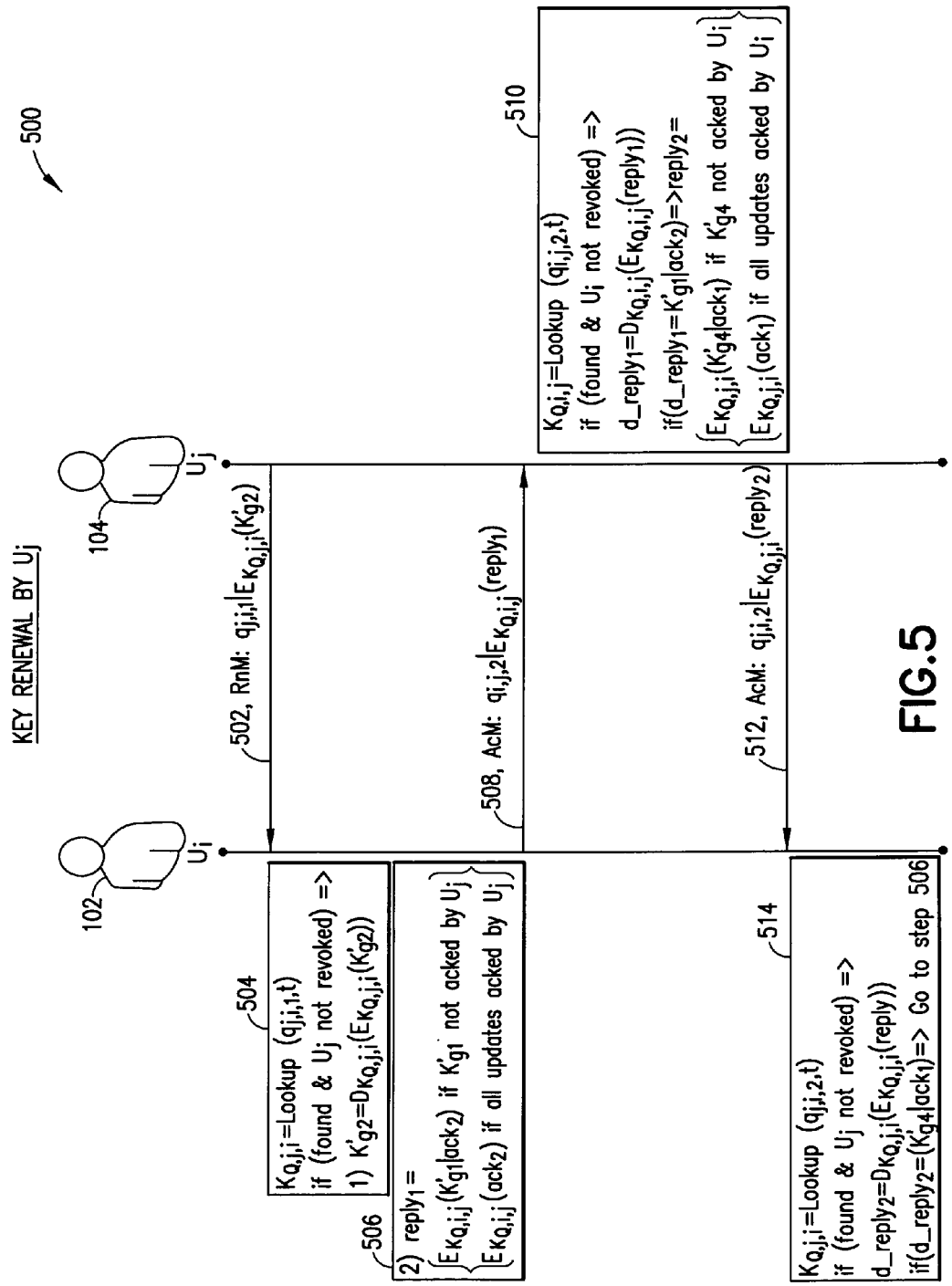

The case in which $U_j$ renews the key is presented in FIG. 5, and the description goes along the same lines.

Based on these figures, it is apparent that:

$U_i$ never uses an encryption key used by $U_j$.

The pseudonyms used by $U_i$ for both renewal and ack messages are different from those of $U_j$.

The pseudonyms used by each node when it plays the member role are different from those used by a node playing the manager role.

Because all messages are broadcast without a destination address, there is no way to use lower layer identifiers to associate a couple pseudonym with a couple of nodes $U_i$ and $U_j$. In addition, because no two messages sent by both senders have an intersecting part (couple pseudonyms or encrypted messages), it is not possible to deduce the actual nodes represented by the pseudonym from the message content. Thus, couple anonymity is preserved.

Proximity Detection

One or more embodiments of the present invention recognize that in many cases where no fixed meeting times are anticipated between nodes, so that it is inefficient in terms of management of communication resources for a node to send key updates without knowing that the target node is in proximity. Moreover, it can be highly inaccurate because there is no correlation between the update instants and presence of the target in proximity. Therefore, one or more embodiments of the present invention provide for a proximity detection element that allows nodes to detect one another's presence. In many cases, it is desired to detect and identify users and all other identifiers are subject to change by the PPM, traditional mechanisms at lower layers fail. Possibilities presented by embodiments of the invention include performing proximity detection using couple pseudonyms or performing detection using user pseudonyms.

To perform proximity detection using couple pseudonyms, node $U_i$ periodically broadcasts beacon messages containing a list of its couple pseudonyms $q_{i,j,1}$, $q_{i,j',1}$, $q_{i,j'',1}$ . . . corresponding to nodes $U_j$, $U_{j'}$, $U_{j''}$ . . . .

The use of user pseudonyms for proximity detection takes advantage of the mutual coupling between nodes. Due to the mutual coupling between the nodes $U_i$ is able to authenticate messages that its group members are sending. This information can be used to determine if a user $U_j$ is in proximity. The group manager $U_i$ maintains a table recording the last time it has received an authenticated message from each user in its group. When it needs to check if $U_j$ is in proximity, $U_i$ performs a query to compare the duration that has elapsed since $U_j$ has last appeared with a custom expiry period $T_{expiry}$.

Such an approach accomplishes proximity detection without a need for additional communication. However, accuracy can be diminished if nodes in proximity do not have a message to send. In one or more embodiments, nodes may be required to send authenticated presence beacons, with the user pseudonyms $z_i$, when they are members of a group but have no content to share. One exemplary beacon format by $U_i$ is: $z_i | F_{K_{A,i}}(h)$, where F is a hash function similar or identical to that described above and h is formed from the header information and the user pseudonym. When nodes send presence beacons, they will receive key updates from others, and will be able to receive and decrypt content.

Mechanisms according to one or more embodiments of the invention further address the effect of changing keys on proximity detection. To illustrate the need for addressing such an effect, suppose that nodes $U_j$ and $U_i$ form a mutual couple. Suppose further that at some time $t_1$ both devices stop meeting. In the meantime between $t_1$ and $t_2$, three possibilities might occur:

1. $U_i$ updates its user key $UK_i$; $U_j$ updates its user key $UK_j$, and both revoke each other.

2. $U_i$ updates its user key $UK_i$; $U_j$ updates its user key $UK_j$, but the two users do not revoke each other.

3. $U_i$ updates its user key $UK_i$; $U_j$ updates its user key $UK_j$, but only one of them revokes the other.

If these devices meet again at $t_2$, a circular dependency on the user keys exists. As previously discussed, these user keys may themselves be group keys.

For the first case, there is no longer a need for key renewal messages between the two users. However, for the other two cases, simply using the proximity detection based on user pseudonyms will fail because the user pseudonyms depend on the changed user keys. We call this the deadlock problem.

For the second case, in which both keys are revoked, one exemplary approach is for one of the parties, for example. $U_i$ to take an approach similar to that of the method used with respect to the couple pseudonyms, but using the pseudonyms of specific nodes, such as $U_j$, characterized by the following condition:

"there is no ack from user $U_j$ corresponding to the last key renewal message by $U_i$, and some period $T_{max}$ has passed since $U_j$ was last seen."

The searching party sends beacons called user search messages, typically containing multiple couple pseudonyms for all the users with such a condition, performing the following steps:

1. $U_j$ sends a user search message containing pseudonyms for nodes with the above condition $(q_{i,j,1} | q_{i,j',1} | q_{i,j'',1} \ldots )$.

2. If $U_j$ finds a match for one of attached pseudonyms $q_{i,j,1}$, it updates its database with the new key. If $U_j$ has not blocked $U_i$ from all its groups, it replies by broadcasting a search acknowledgment message, encrypted with $K_{Q,j,i}$ and containing $q_{j,i,2}$ as a pseudonym. In case $U_j$ also has a new group key $K'_{g2}$ to transmit to $U_i$, the encrypted message contains that key to save a new key renewal operation.

3. $U_i$ replies by initiating a key renewal for $U_j$ as described above.

In another approach, a server, such as an online server, can be employed for sharing the user key updates only. The server need not a trusted one, but may simply serve as a broadcast medium where the user key updates can be spread when the user goes online, in order to address the problem of changing keys and prevent proximity detection from being impaired by such changing of keys.

As noted above, another scenario involves the changing of keys by both users but the revocation of only one user by the other. Suppose that $U_j$ is the revoked party. There is no distributed and anonymous way to notify $U_j$ to stop sending user search messages including $U_i$—that is, without either using a trusted third party, allowing $U_i$ to know that he has been revoked, or both. Proximity detection may be designed to forge a compromise between (1) detection by $U_j$ of devices that have not been seen recently when they appear again and (2) $U_i$ continuing to beacon rarely seen devices that have revoked it.

An exemplary approach according to an embodiment of the invention, applicable to the case in which neither user revokes the other and the case in which one user revokes the other, would be to stop sending such user search messages for a specific user after a certain period and to require the user's intervention to restore the shared user keys. A user would manually trigger a key renewal operation for a specific user upon physically noticing his presence while not being able to detect him via the device.

FIGS. 2-7 illustrate exemplary procedures undertaken to share, update, and revoke keys while preserving anonymity, according to one or more embodiments of the present invention. FIG. 2 illustrates a mutual coupling procedure 200, where users i and j (102 and 104) exchange needed identifiers and keys. $U_i$ and $U_j$ are static and persistent user identifiers for users i and j.

$UK_i$ and $UK_j$ are user specific secret user keys. Temporary authentication keys $K_{A,i}$ and $K_{A,j}$ are derived from the user keys. Authentication keys are used during later message exchange when user i and j originated messages are signed (by a transmitter) and verified (by a receiver).

$Q_{i,j}$ and $Q_{j,i}$ are couple identifiers. A couple identifier identifies unique binding of one user to another user ($U_i$, $U_j$) and ($U_j$, $U_i$). A pair of couple identifiers forms a bidirectional binding between two users.

$RK_{i,j}$ and $RK_{j,i}$ are static renewal keys. Temporary couple encryption keys $K_{Q_i,j}$ and $K_{Q_j,I}$ are derived from the renewal keys. Couple encryption keys are used to encrypt renewal messages. In the example shown here, the user i (102) passes $U_i$, $UK_i$, $Q_{i,j}$, and $RK_{i,j}$ to the user j (104) in a transmission 202, and the user j (104) passes $U_j$, $UK_j$, $Q_{j,i}$, and $RK_{j,i}$ to the user i (102) in a transmission 204.

Figure 3:
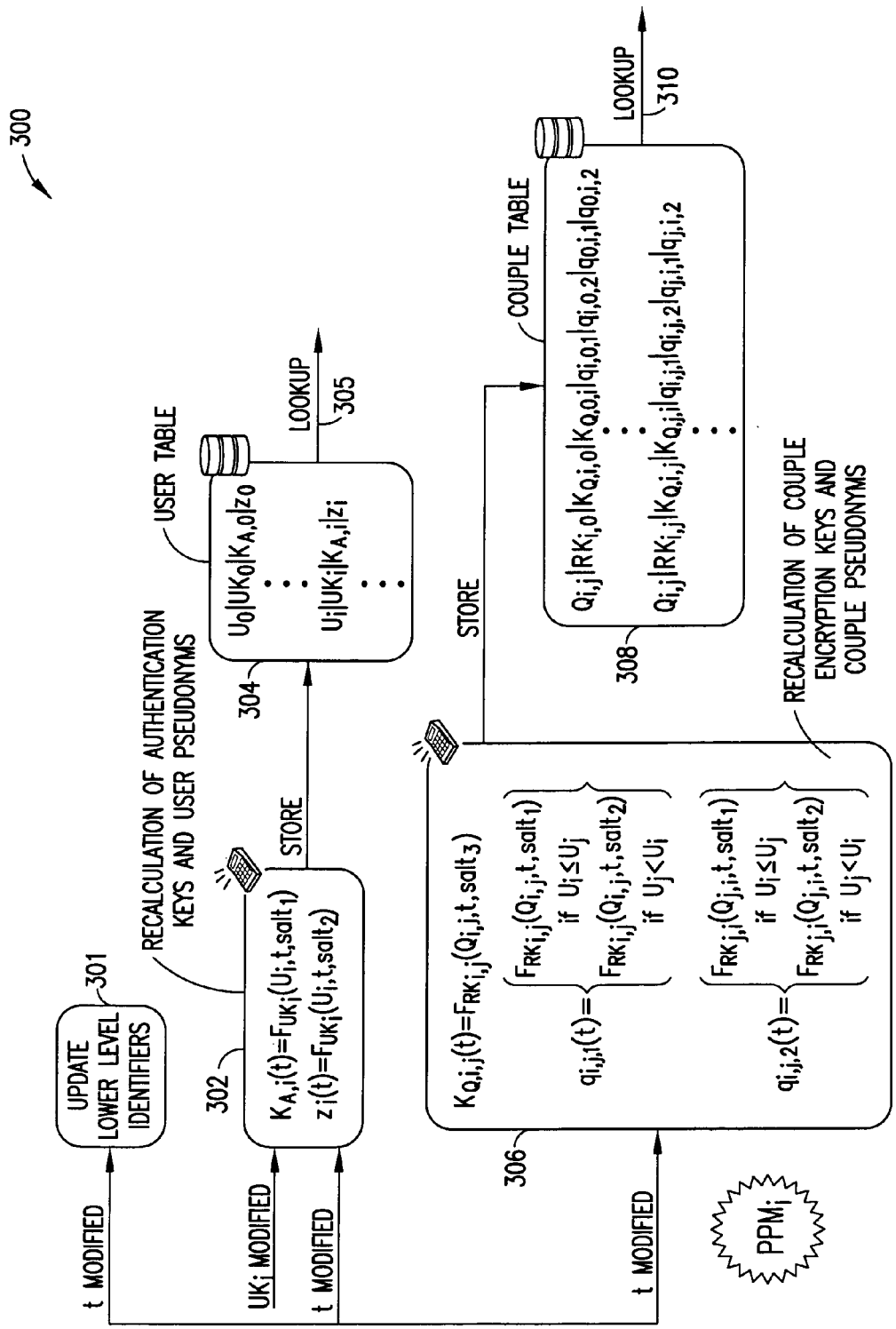

FIG. 3 illustrates a privacy preserving mechanism 300, in which keys and pseudonyms are updated at each new period (that is, at each change of the time t, marking an interval, or upon key changes.) Updating of lower level identifiers is performed at the procedure 301, and authentication keys ($K_{A,i}$) and user pseudonyms ($z_i$) are recalculated during the procedure 302 by the function $F_{UKi}$. A user table 304 contains static user identifiers ($U_0$), static user keys ($UK_0$) and calculated authentication keys and user pseudonyms for each known user for the current time period t. When a device receives a message containing a user pseudonym $z_i$ there is a user table lookup 305 in order to find corresponding user and an authentication key for the user. Couple encryption keys ($K_{Q,I,j}$) and couple pseudonyms ($q_{i,j,1}$) are recalculated at the procedure 306 by the function $F_{RKi,j}$.

A couple table 308 contains couple identifiers ($Q_{i,j}$, $Q_{j,i}$), renewal keys ($RK_{i,j}$, $RK_{j,i}$) and calculated couple encryption keys ($K_{Q,i,j}$, $K_{Q,j,i}$) and couple pseudonyms (e.g. $q_{i,j,1}$) for the current time period t. When a device receives a message containing a couple pseudonym then there is a couple table lookup 310 in order to find corresponding coupling information.

FIG. 4 illustrates key renewal 400 as initiated by user i (102):

1. User $U_i$ owns and manages a group $g_1$. The user $U_i$ starts the key renewal procedure for a group $g_1$. The user's device detects that a user $U_j$ (104) that belongs to the group $K_{g1}$, is in proximity and $U_j$ has not acknowledged key renewal. The device performs a transmission 402 of a key renewal message RnM containing a couple pseudonym $q_{i,j,1}$ and encrypted message contents. Because the target for key renewal may be a user key or a group key, the encrypted portion contains a pseudonym and a renewed key. For users a renewal message RnM is as follows:

RnM: $q_{i,j,1}|E_{KQ,i,j}(z_i|UK'_i)$ for renewed user key $UK'_i$, for the user $U_i$ For groups a renewal message RnM is as follows:

RnM: $q_{i,j,1}|E_{KQ,i,j}(x_g|K'_g)$ for renewed group key $K'_g$ for the group g $U_j$ can determine a target for key renewal by inspecting the encrypted pseudonym. If it is a user pseudonym for $U_i$ then the user key for $U_i$ is to be renewed. If it is a group pseudonym for a group g then the group key for the group g is to be renewed.

2. When the device of the user $U_j$ receives the key renewal message containing the couple pseudonym, the device performs a couple table lookup 403 in order to find stored couple information. If couple information is found and the user $U_i$ is not revoked by the user $U_j$ then the device decrypts renewal message contents using the couple encryption key $K_{Q,i,j}$. Then the device determines the target for key renewal. A lookup is done to the user table and the group table to find out whether there is a user or a group matching the encrypted pseudonym. Here the renewed key is for a known group $g_1$ and thus the key is a new group key $K'_{g1}$. Then the device constructs a reply message 404. If the device detects that there is a pending key renewal for $U_i$ concerning a group $g_2$ then the constructed reply message contains encrypted new group key $K'_{g2}$ and acknowledgement for key renewal for the group $g_1$. Acknowledgement contains a group pseudonym $x_{g1}$ for the group $g_1$. If there is no need to renew a group key then a reply contains only encrypted key renewal acknowledgement for the group $g_1$.

3. The device of the user $U_j$ performs a transmission 406 of the acknowledgment message AcM containing a couple pseudonym $q_{j,i,2}$ and the constructed reply.

4. When the device of the user $U_i$ receives the key renewal acknowledgement message containing the couple pseudonym, the device makes a couple table lookup 408 in order to find stored couple information. If couple information is found and the user $U_j$ is not revoked by the user $U_i$ then the device decrypts the reply message by using the couple encryption key $K_{Q,j,i}$. If the reply contains an acknowledgement to key renewal of the group $g_1$ then the device updates the user table element for $U_j$. If the reply contains a key renewal for a group $g_2$ then the device takes the new key $K'_{g2}$ into use and constructs a key renewal acknowledgement message for that group.

5. If the device of $U_i$ has constructed a key renewal acknowledgement message (AcM) for the group $g_2$ then the device performs a transmission 410 of the acknowledgement message.

6. The device of the user $U_j$ receives the reply message. The key renewal acknowledgement message for the group g2 indicates that $U_i$ has done key renewal for that group. The key renewal for the group $g_3$ begins an update similar to that presented in step 2 above. The device of the user $U_j$ performs a couple table lookup 412, and if there are more groups that need key renewal then renewal process continues as at (2) above (by returning to step 404) until all the pending renewals have been completed.

FIG. 5 illustrates key renewal as initiated by the user j (104), having the identifier $U_j$.

1. The user $U_j$ owns and manages a group $g_2$, and starts the key renewal procedure for the group $g_2$. The user's device detects that a user $U_i$ that belongs to the group $K_{g2}$ is in proximity and $U_i$ has not acknowledged key renewal. The device performs a transmission of a key renewal message RnM containing a couple pseudonym $q_{j,i,1}$ and the new group key $K'_{g2}$ encrypted using the couple encryption key $K_{Qj,i}$. The step is similar to the step 1 in FIG. 4, expect that used couple pseudonym and couple encryption key is from the direction $(U_j, U_i)$ instead of $(U_i, U_j)$.

2. The device of the user $U_i$ performs a lookup 504 by couple pseudonym $q_{j,i,1}$ and user table update for the user $U_j$. The device performs construction 506 of a reply message AcM containing key renewal acknowledgement for the group $g_2$ and key renewal for the group $g_1$.

3. The device of the user $U_i$ performs a transmission 508 of the reply message, including acknowledgement for $g_2$ key renewal and key renewal for $g_1$.

4. The device of the user $U_j$ receives the reply message, performing a lookup 510 according to the couple pseudonym $q_{i,j,2}$ and user table update for the user $U_i$. The device of the user $U_j$ constructs a key renewal acknowledgement for the group $g_1$ and a key renewal for the group $g_4$.

5. The device of the user $U_j$ performs transmission 512 of the acknowledgement message, including acknowledgement for g1 key renewal and key renewal for $g_4$.

6. The device of the user $U_i$ receives the acknowledgement message, and performs a lookup 514 based on the couple pseudonym $q_{i,j,2}$ and user table update for the user $U_j$. The device of the user user $U_i$ constructs a key renewal acknowledgement for the group $g_4$. If there are more groups that need key renewal then procedure continues (by returning to 506) until all the group keys have been updated.

Figure 6:
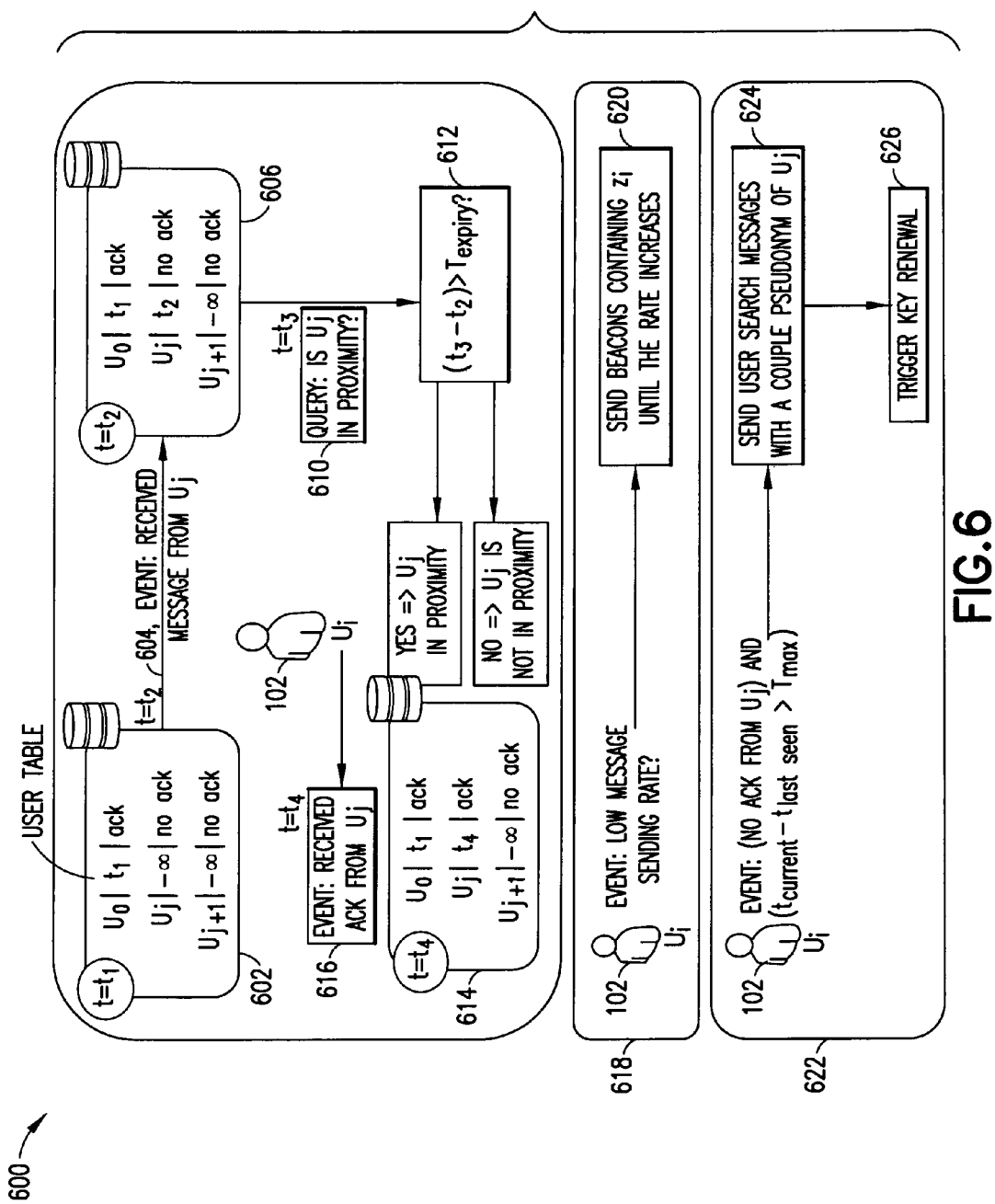

FIG. 6 illustrates proximity detection 600 as performed, for example, by a device of the user $U_i$ (102), including the normal query, occasional beacons, and the search messages approaches.

The user table 602 contains detection time information and key renewal state for each known user. For example at time t=t1 the user table contains the following information about users $U_0$, $U_j$ and $U_{j+1}$ 1. User proximity detection information at time t=t1:
   User $U_0$ was last detected at time $t_1$. The device has received a renewal acknowledgement message from $U_0$. User information between this user and the user $U_0$ is up-to-date.
   2. Users $U_j$ and $U_{j+1}$ have not been detected (or they have been detected a long time ago) and thus user information between this user and the users $U_j$ and $U_{j+1}$ is not up-to-date.
   3. At t=t2 the device receives an authenticated data message 604 from $U_j$. including user proximity detection information 606 at time t=t$_2$:
   User $U_0$: no change since t=t1.
   User $U_j$ was last detected at time t2. No key renewal acknowledgement since the last key renewal.
   User $U_{j+1}$: no change since t=t1.
   4. At time t=t3 an inquiry 610 is made as to whether the user $U_j$ is in proximity. If the last authenticated message was received within a given time threshold (by comparing at 612 the difference between t3 and t2 with an expiry time) then the user $U_j$ is considered to be in proximity; otherwise the user $U_j$ is not in proximity. A determination that the user $U_j$ is in proximity may trigger key renewal. When a key renewal or a key renewal acknowledgement message is received from $U_j$, it is known that user information of $U_j$ is up to date.

Determination that the user $U_j$ is within proximity may trigger a key renewal, as described above in connection with FIG. 4. When a key renewal or a key renewal acknowledgement message is received from $U_j$, it is known that user information of $U_j$ is up to date.

User proximity detection information 614 at time t=t3 may be, for example:
   User $U_0$: no change since t=t1.
   User $U_j$ was last detected at time t4. (For example, at a received acknowledgement 616 from $U_j$). User information between for the user $U_j$ is up to date.
   User $U_{j+1}$: no change since t=t1.

Additional approaches include the use of beacons and the use of search messages. Upon experiencing at 618 a low message sending rate, the device, at 620, sends beacons, such as dummy authenticated messages including $z_i$, until the rate increases. Such an approach allows other devices to detect the presence of the user 102.

A further approach is the initiation of a user search procedure 622. A device may perform the sending 624 of user search messages if the device has performed a key renewal but has not detected another user affected by the key renewal for a specified period. Once a device is found, the device of the user 102 may perform a key renewal at 626.

Figure 7:
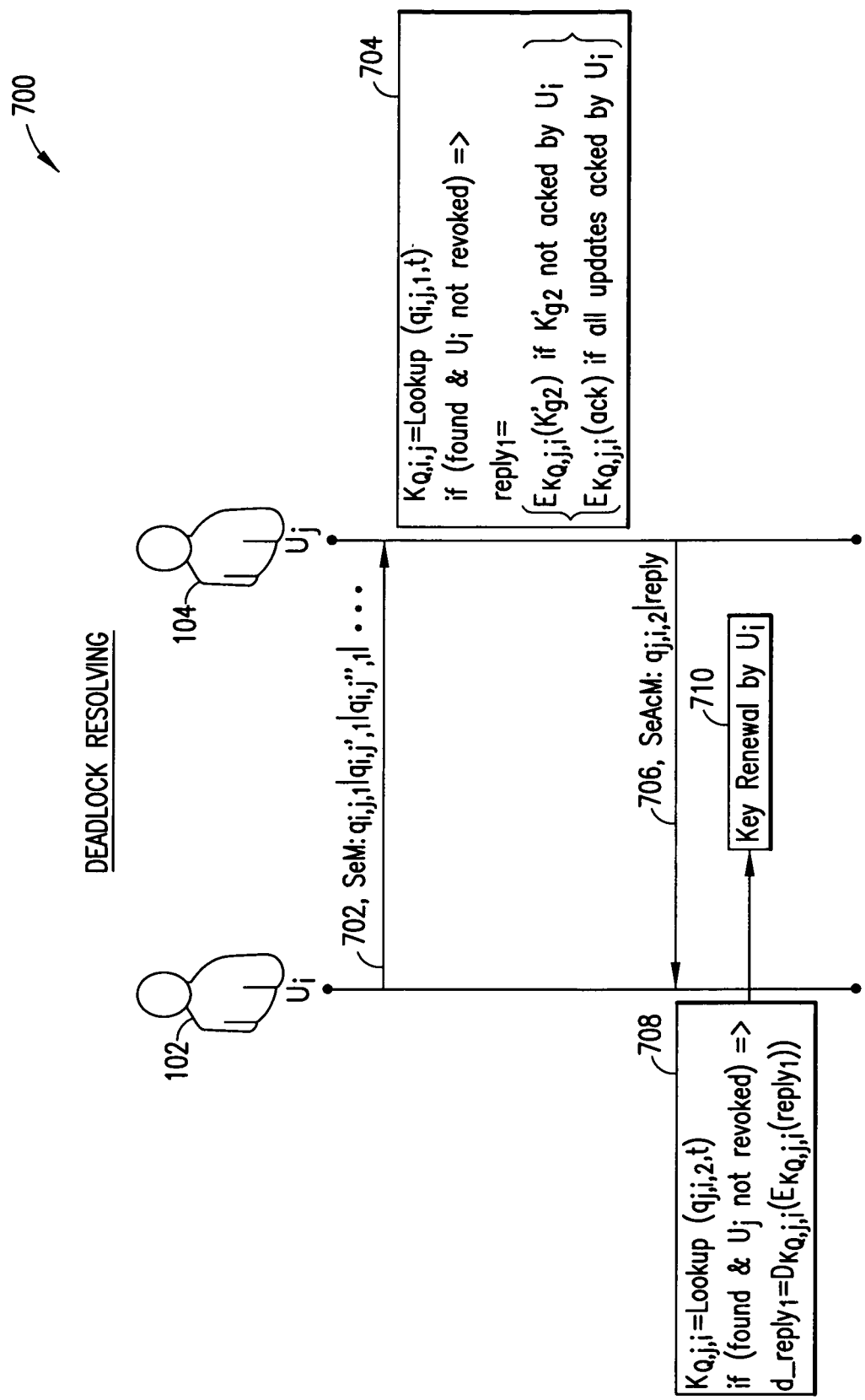

FIG. 7 illustrates an example of resolution of deadlock—proximity detection failure due to key changes.

1. User $U_i$ owns and manages a group $g_1$. The user $U_i$ has performs key renewal for a group $g_1$. $U_i$ has not detected $U_j$, $U_{j'}$ and $U_{j''}$ in proximity for a predefined period. One reason might be that the users have updated their user keys, such as $UK_j$, and Ui has not received renewed keys, such as $UK'_j$. Thus even if $U_i$ has received messages, such as from $U_j$, $U_i$ is not able to identify or verify $U_j$, because user pseudonym $z_j$ is unknown to $U_i$. The device of $U_i$ may start a user search procedure in order to find out when the user Uj (and $U_{j'}$, $U_{j''}$, and so on) is in proximity. User search may be periodically run or the user may request to initiate user search when she knows that $U_j$ might be in proximity.

2. User $U_i$'s device performs transmission 702 of a user search message (SeM). The user search message contains a set of couple pseudonyms $(q_{i,j,1}, q_{i,j',1}, q_{i,j'',1}, \ldots)$ for users whose presence $U_i$ wants to know. Because couple identifiers are static, a user $U_j$ should recognize the couple identifier $q_{i,j,1}$.

3. The device of $U_j$ receives the user search message 702. The device performs a couple table lookup 704 to find whether there are matching couple pseudonyms. If a match is found and $U_j$ has not revoked the user that matches then the device constructs a reply message. A reply message may contain a piggybacked key renewal for a user key or a group key. For example, $E_{KQj,1}(x_{g2}|K'_{g2}|z_j)$ contains a piggybacked key renewal for a group $g_2$ (group pseudonym $x_{g2}$ and new key $K'_{g2}$) and a presence indication for $U_j$ (user pseudonym $z_j$). A reply message is encrypted using the couple encryption key $K_{Qj,i}$.

4. The user $U_j$'s device performs transmission 706 of a user search acknowledgement message.

5. The device of $U_i$ receives the user search acknowledgement message. The device performs a couple table lookup 708 in order to find stored couple information. If couple information is found and the user $U_j$ is not revoked by the user $U_i$ then the device decrypts renewal message contents using the couple encryption key $K_{Qj,i,2}$. By the decrypted user pseudonym $z_j$ the device knows that the user $U_j$ is in proximity.

6. Normal key renewal procedure 710 may begin as presented in FIG. 4 and discussed above, if $U_i$ has renewed keys and $U_j$ needs to be informed about the renewed keys.

Determination that the user $U_j$ is within proximity may trigger a key renewal procedure such as those illustrated at FIGS. 3 and 4 and discussed above. When the device receives a key renewal or a key renewal acknowledgement message from $U_j$ then this device knows that user information of $U_j$ is up-to-date.

User proximity detection information at time t=t3:
   User $U_0$: no change since t=t1.
   User $U_j$ was last detected at time t4. User information between this user and the user $U_j$ is up-to-date.
   User $U_{j+1}$: no change since t=t1.

If a device has no own (authenticated) data messages to be transmitted then a device may device to transmit dummy authenticated beacon messages. This enables other devices to detect presence of this user.

A device may initiate a user search procedure if a device has made a key renewal procedure and the device has not detected another user that is affected by the key renewal procedure for a while. If a user is detected then a device may trigger the key renewal procedure.

Figure 8:
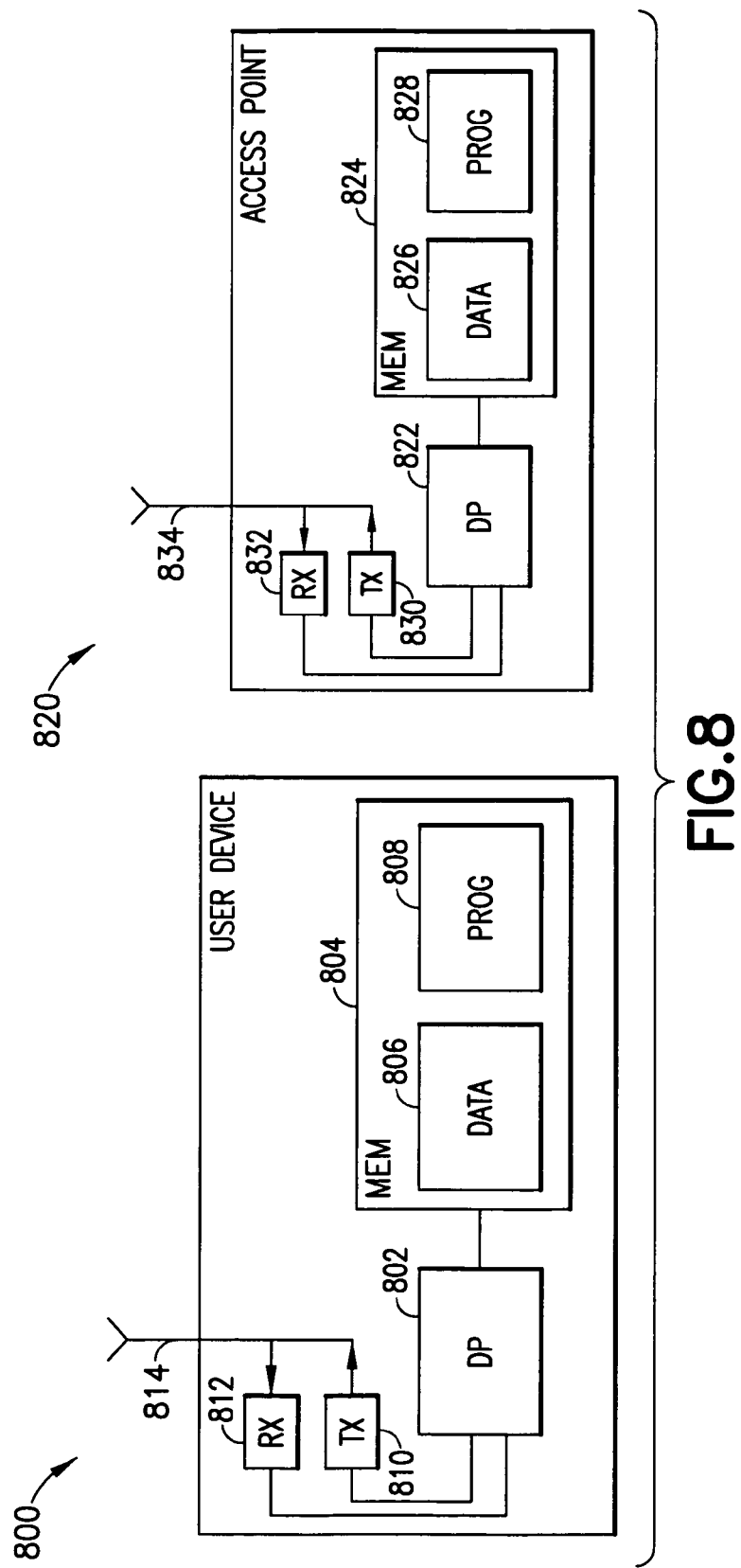
FIG. 8 illustrates a user device according to an embodiment of the present invention.

FIG. 8 illustrates an exemplary user device 800 according to an embodiment of the present invention, configured to act, for example, as a device controlled by a user of a system such as the system 100, whether by a data owner or a data requester. It will be recognized that a user may take on the role of a data owner or a data requester at different times, under appropriate circumstances. The device is illustrated here as possessing wireless communication capabilities, but it will be recognized that such a configuration is exemplary, and that any number of configurations may be employed.

The user device comprises a data processor 802 and memory 804, with the memory 804 suitably storing data 806 and software 808. The user device 800 further comprises a transmitter 810, receiver 812, and antenna 816. The software 806 stored in memory 804 includes program instructions (software (SW)) that, when executed by the associated data processor 802, enable the user device to operate in accordance with the exemplary embodiments of this invention. That is, the exemplary embodiments of this invention may be implemented at least in part by computer software executable by the DP 802 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

FIG. 8 also illustrates an exemplary wireless access point 820, allowing communication by wireless communication devices which may, for example, as part of a wireless local area network or a wireless cellular network. The access point 820 may, for example, take the form of a base station in a wireless cellular network or, to take another example, a wireless network access point. The access point 820 may take any number of other implementations.

The access point 820 comprises a data processor 822 and memory 824, with the memory 824 suitably storing data 826 and software 828. The access point 820 further comprises a transmitter 830, receiver 832, and antenna 836. The software 826 stored in memory 424 includes program instructions (software (SW)) that, when executed by the associated data processor 822, enable the user device to operate in accordance with the exemplary embodiments of this invention. That is, the exemplary embodiments of this invention may be implemented at least in part by computer software executable by the DP 802 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

The various embodiments of the user device 800 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 804 and 824 may be of any type suitable to the local technical environment and may be implemented using any suitable data storage technology, such as semiconductor based memory devices, flash memory, magnetic memory devices and systems, optical memory devices and systems, fixed memory and removable memory. The data processors 802 and 822 may be of any type suitable to the local technical environment, and may include one or more of general purpose computers, special purpose computers, microprocessors, digital signal processors (DSPs) and processors based on multi-core processor architectures, as non-limiting examples.

In one embodiment of the invention, an apparatus comprises at least one processor and memory storing a program of instructions, wherein the memory storing the program of instructions is configured to, with the at least one processor, cause the apparatus to at least define a set of user pseudonyms for a wireless device wherein each message associated with the device employs an authentication key derived from a user key based at least in part on a user pseudonym.

In another embodiment of the invention, the authentication key is changed after each of a sequence of defined time periods.

In another embodiment of the invention, the authentication key is derived from a user key that is changed upon a determination to prevent at least one previously authorized device from verifying a message of the wireless device.

In another embodiment of the invention, an apparatus comprises at least one processor and memory storing a program of instructions, wherein the memory storing the program of instructions is configured to, with the at least one processor, cause the apparatus to at least define a couple pseudonym unique to an associated couple of devices.

In another embodiment of the invention, one member of the couple of devices is a group manager and the other member of the couple is a group member.

In another embodiment of the invention, the apparatus also defines an individual key shared between the members of the couple.

In another embodiment of the invention, the couple identifier is defined so as to prevent deterministic verification that the couple pseudonym is a valid couple pseudonym of the couple sharing it.

In another embodiment of the invention, an apparatus comprises at least one processor and memory storing a program of instructions, wherein the memory storing the program of instructions is configured to, with the at least one processor, cause the apparatus to at least store data identifying its most recent detection of an authenticated message from a user in a group of which a specified wireless device is the manager and to determine if the user is in proximity by comparing an elapsed duration since a message from the user was detected with an expiration period.

In another embodiment of the invention, the apparatus authenticates a presence beacon sent periodically from a user having no content to share.

In another embodiment of the invention, an apparatus comprises at least one processor and memory storing a program of instructions, wherein the memory storing the program of instructions is configured to, with the at least one processor, cause the apparatus to at least send a user search message for containing pseudonyms for all nodes that have failed to acknowledge a most recent key renewal message by a group manager and that have not been detected for a predetermined period; and, upon receiving a search acknowledgement message, to update a database with a new key and to initiate a key renewal.

In another embodiment of the invention, the apparatus stores key information at an online server.

In another embodiment of the invention, the apparatus ceases sending user search messages after no response has been received from the user for a specified period.

In another embodiment of the invention, the apparatus performs a key renewal operation for the user upon a manual selection.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
    at least one processor;
    memory storing a program of instructions;
    wherein the memory storing the program of instructions is configured to, with the at least one processor, cause the apparatus to at least:
    exchange, between a first user device and a second user device, couple identifiers to form a paired couple of user devices during a pairing procedure;
    derive a set of asymmetric couple pseudonyms based at least on the couple identifiers and a renewal key, wherein the paired couple of user devices are wireless devices belonging to a group communicating messages encrypted by a shared key in a mobile ad hoc network; and
    broadcast, by the first user device, at least one message to the group wherein the at least one message comprises an asymmetric couple pseudonym from the set of asymmetric couple pseudonyms identifying that the at least one message is intended for the second user device.

2. The apparatus of claim 1, wherein the first user device is a group manager and the second user device is a group member.

3. The apparatus of claim 1, wherein the memory storing the program of instructions is configured to, with the at least one processor, cause the apparatus to at least:
    derive a temporary couple encryption key based at least on the couple identifiers and a current time, and wherein the at least one broadcasted message is encrypted based on the temporary couple encryption key.

4. The apparatus of claim 3, wherein the set of asymmetric couple pseudonyms and the temporary couple encryption key are changed at a same time after each of a sequence of defined time periods.

5. The apparatus of claim 1, wherein the couple identifiers are defined so as to prevent deterministic verification that the asymmetric couple pseudonym is a valid asymmetric couple pseudonym of the couple of user devices sharing it.

6. The apparatus of claim 1, wherein the at least one message comprises a new shared key for communicating messages with the group.

7. A method comprising:
    exchanging, between a first user device and a second user device, couple identifiers to form a paired couple of user devices during a pairing procedure;
    deriving a set of asymmetric couple pseudonyms based at least on the couple identifiers and a renewal key, wherein the paired couple of user devices are wireless devices belonging to a group communicating messages encrypted by a shared key; and
    broadcasting, by the first user device, at least one message to the group wherein the at least one message comprises an asymmetric couple pseudonym from the set of asymmetric couple pseudonyms identifying that the at least one message is intended for the second user device.

8. The method of claim 7, wherein the first user device is a group manager and the second user device is a group member.

9. The method of claim 7, the method further comprising deriving a temporary couple encryption based at least on the couple identifiers and a current time, and wherein the at least one broadcasted message is encrypted based on the temporary couple encryption key.

10. The method of claim 9, wherein the set of asymmetric couple pseudonyms and the temporary couple encryption key are changed at a same time after each of a sequence of defined time periods.

11. The method of claim 7, wherein the couple identifiers are defined so as to prevent deterministic verification that the asymmetric couple pseudonym is a valid asymmetric couple pseudonym of the couple of user devices sharing it.

12. The method of claim 7, wherein the at least one message comprises a new shared key for communicating messages with the group.

13. A non-transitory computer-readable medium having computer program instructions stored thereon, which when executed by a device causes the device to perform at least:
    exchanging, between a first user device and a second user device, couple identifiers to form a paired couple of user devices during a pairing procedure;
    deriving a set of asymmetric couple pseudonyms based at least on the couple identifiers and a renewal key, wherein the paired couple of user devices are wireless devices belonging to a group communicating messages encrypted by a shared key; and
    broadcasting, by the first user device, at least one message to the group wherein the at least one message comprises an asymmetric couple pseudonym from the set of asymmetric couple pseudonyms identifying that the at least one message is intended for the second user device.

14. The non-transitory computer-readable medium of claim 13, wherein the first user device is a group manager and the second user device is a group member.

15. The non-transitory computer-readable medium of claim 13, the device is caused further to perform:
deriving a temporary couple encryption based at least on the couple identifiers and a current time, and wherein the at least one broadcasted message is encrypted based on the temporary couple encryption key.

16. The non-transitory computer-readable medium of claim 15, wherein the set of asymmetric couple pseudonyms and the temporary couple encryption key are changed at a same time after each of a sequence of defined time periods.

17. The non-transitory computer-readable medium of claim 13, wherein the couple identifiers are defined so as to prevent deterministic verification that the asymmetric couple pseudonym is a valid asymmetric couple pseudonym of the couple of user devices sharing it.

18. The non-transitory computer-readable medium of claim 13, wherein the at least one message comprises a new shared key for communicating messages with the group.

* * * * *